UNITED STATES PATENT OFFICE.

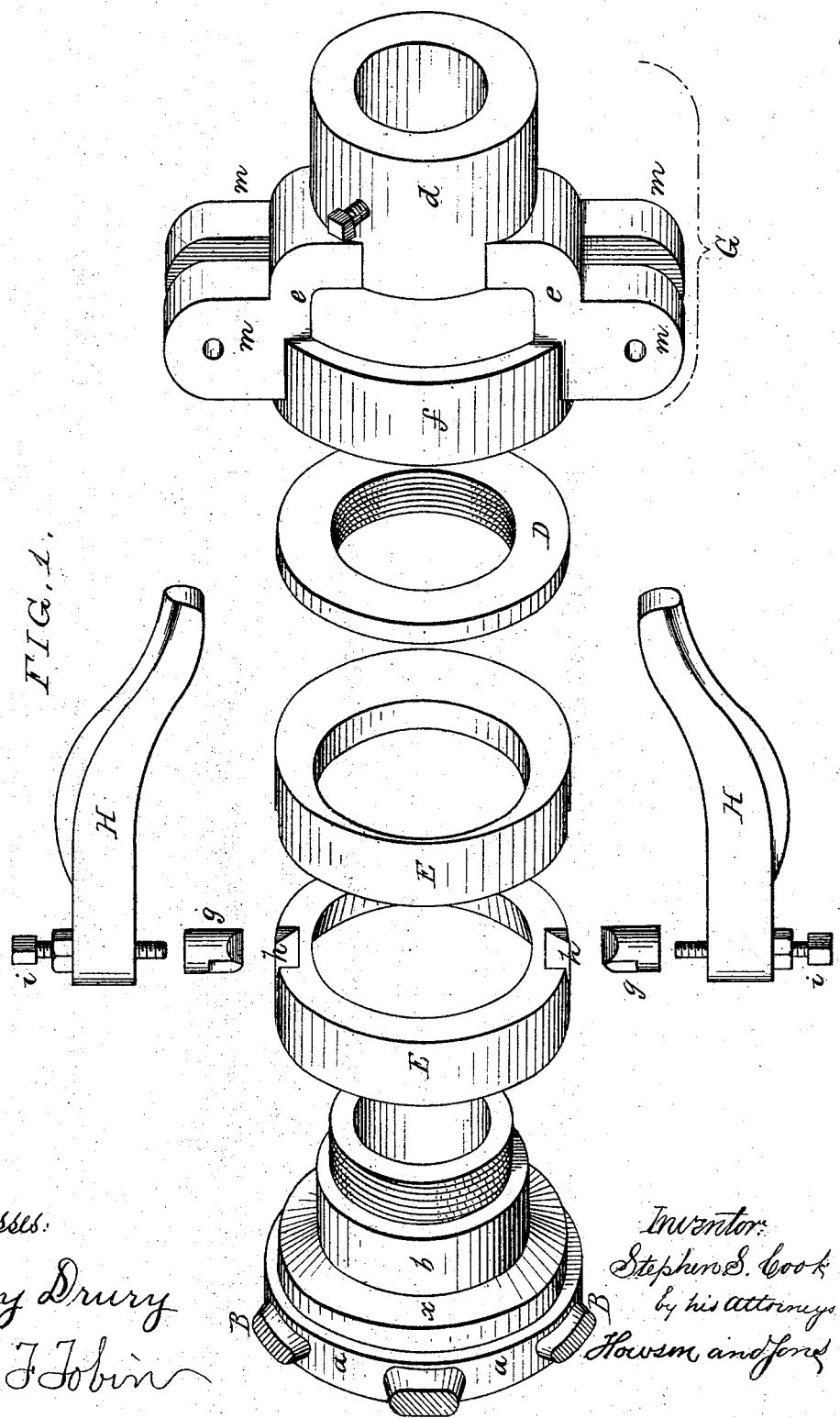

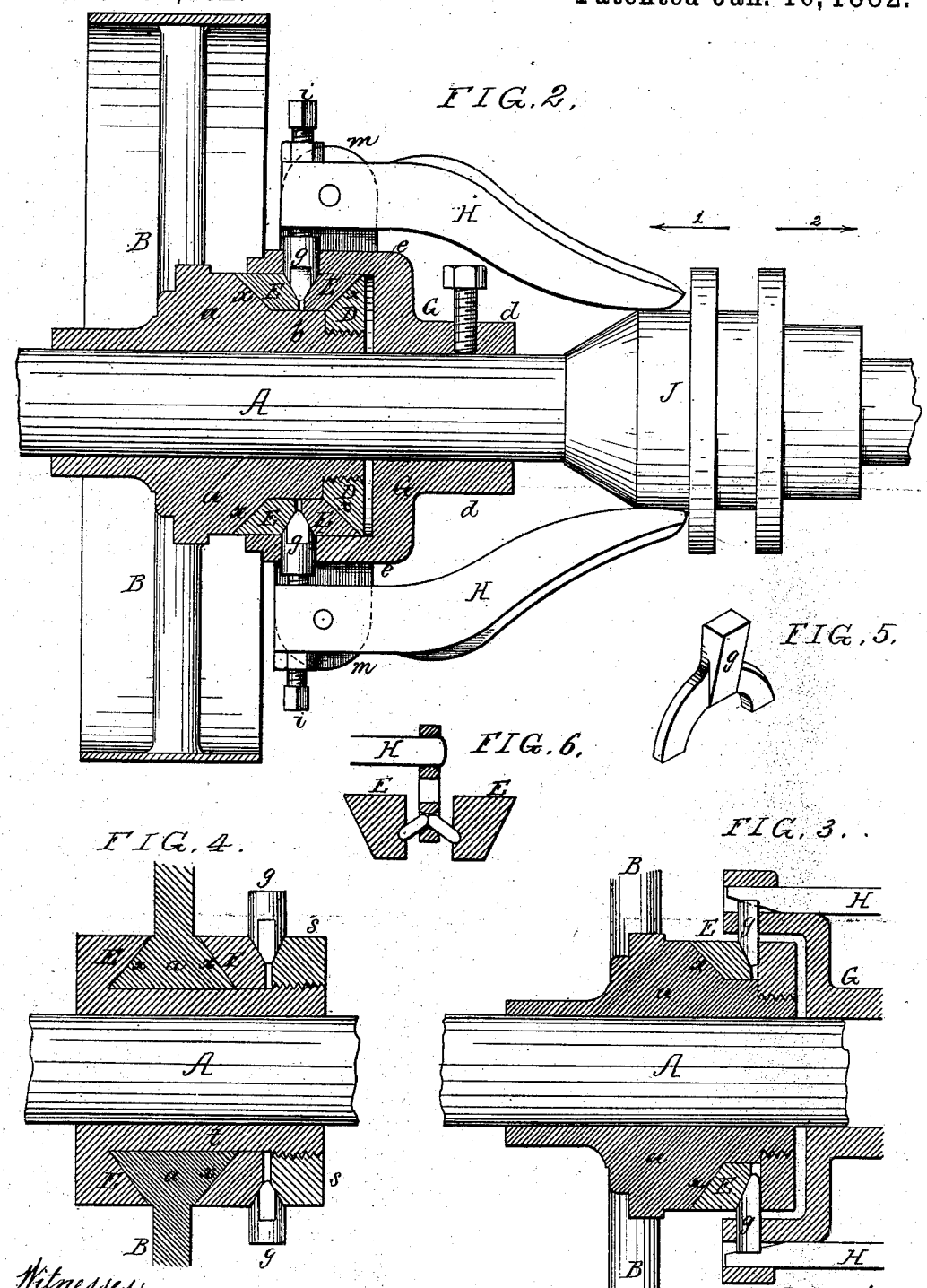

STEPHEN S. COOK, OF PHILADELPHIA, PENNSYLVANIA.

FRICTION-CLUTCH.

SPECIFICATION forming part of Letters Patent No. 252,192, dated January 10, 1882.

Application filed December 12, 1881. (No model.)

*To all whom it may concern:*

Be it known that I, STEPHEN S. COOK, a citizen of the United States, residing in Philadelphia, Pennsylvania, have invented certain Improvements in Friction-Clutches, of which the following is a specification.

The object of my invention is to so construct a friction-clutch that a firm gripe upon the pulley will be insured and undue friction prevented when the pulley is released from the shaft; and this object I attain in the manner which I will now proceed to describe, reference being had to the accompanying drawings, in which—

Figure 1, Sheet 1, is a perspective view of the different parts of my improved clutch detached from each other; Fig. 2, Sheet 2, a longitudinal section of the clutch; and Figs. 3, 4, 5, and 6, sectional views, illustrating modifications of my invention.

A is a shaft, and B a pulley to be clutched thereto. On the hub $a$ of the pulley is an annular friction-surface, $x$, beveled in the present instance, and projecting from the said hub $a$ is a sleeve, $b$, the outer end of which is threaded for the reception of a ring, D, forming a flange on the sleeve, the inner face of said flange being beveled, so as to form a friction-surface, $x$, similar to that on the hub $a$.

Between the hub $a$ and flange D are a pair of rings, E E, which are free to turn on the sleeve $b$, the inner faces of these rings being parallel with each other, but the outer face of one ring being beveled to coincide with the friction-surface $x$ of the hub $a$, and the outer surface of the other ring being beveled for adaptation to the surface $x$ of the flange D.

Secured to the shaft A is a frame, G, comprising in the present instance a hub, $d$, arms $e\ e$, and a ring, $f$, the arms $e\ e$ overhanging the flange D and rings E, and the ring $f$ surrounding the latter.

To openings in the arms $e\ e$ are adapted a pair of bolts, $g\ g$, the inner ends of which are wedge-shaped, and are adapted to recesses $h$ in the faces of the rings E E. The wedge-bolts $g$ are free to slide in the openings in the arms $e$, and are acted upon by set-screws $i$, carried by the short arms of levers H, the latter being hung to lugs $m$ on the arms $e$.

A conical sleeve, J, is free to slide on the shaft A, this sleeve being operated by a suitable arm or lever, and acting upon the long arms of the levers H, so that when the sleeve is moved in the direction of the arrow 1, Fig. 2, the levers H will be vibrated, the wedge-bolts $g$ will be thrust inward, the rings E E will be expanded against the friction-faces $x$ of the hub $a$ and flange D, and the wheel B will thus be securely clamped to the shaft, a movement of the sleeve J in the direction of the arrow 2 reversing these movements and permitting the rings E E to revolve freely on the sleeve $b$ of the hub $a$ without coming into close frictional contact with either the face $x$ of the hub or that of the flange D.

In Fig. 3 I have shown a modification of my invention in which but one ring E is used, the backs of the wedge-bolts in this case bearing directly upon the flange D of the sleeve $b$. In this case I prefer to make the wedge-bolts as shown in Fig. 5, so that the back of each bolt will present an extended surface for bearing upon the flange D.

In Fig. 4 I have shown a still further modification, in which the two friction-surfaces $x\ x$ are formed on opposite sides of the hub of the wheel, the wedge-bolts $g$ in this case acting upon one of the rings E and upon a flange, $s$, on a sleeve, $t$, which projects from the other ring E, said sleeve passing through the hub of the wheel and turning upon the shaft A.

Means other than the levers H may, if desired, be employed for operating the wedge-bolts $g$. For instance, arms rigidly secured to a sliding sleeve on the shaft and adapted to slots in the frame G may be used, as shown in Fig. 3, the ends of said arms being inclined and adapted to act directly upon the outer ends of the wedge-bolts $g$; or the levers H may be used in connection with other devices than the wedge-bolts. A pair of toggle-levers, for instance, connected to the short arm of each of the levers H and combined with the friction-rings, as shown in Fig. 6, might in some cases be considered available.

In some cases my invention may be used to couple two shafts together, the frame G in this case being carried by one shaft and the pulley B by the other.

I claim as my invention—

1. The combination of a shaft, A, the pulley

B, having two friction-surfaces, $x\ x$, the longitudinally-sliding friction ring or rings E, a frame, G, secured to and turning with the shaft A, and mechanism, substantially as described, carried by said frame G and adapted to operate the ring or rings E, as set forth.

2. The combination of the shaft A, the pulley B, having two friction-surfaces, $x\ x$, the longitudinally-sliding ring or rings E, a frame, G, secured to the shaft A, wedge-bolts $g$, carried by the frame, and arms or levers, also carried by the frame and serving to actuate said wedge-bolts, as set forth.

In testimony whereof I have signed my name to this specification in the presence of two subscribing witnesses.

STEPHEN S. COOK.

Witnesses
  HARRY DRURY,
  HARRY SMITH.